(12) United States Patent
Winkler (10) Patent No.: US 7,047,710 B2
(45) Date of Patent: May 23, 2006

(54) APPARATUS FOR DEPOSITING A PACKING UNIT AT A DESIRED POSITION ON A LOAD CARRIER

(75) Inventor: Walter Winkler, Parkstein (DE)

(73) Assignee: Logistik + Informatik GmbH, Parkstein (DE)

( * ) Notice: Subject to any disclaimer, the term of this patent is extended or adjusted under 35 U.S.C. 154(b) by 110 days.

(21) Appl. No.: 10/600,411

(22) Filed: Jun. 20, 2003

(65) Prior Publication Data

US 2004/0191049 A1    Sep. 30, 2004

(30) Foreign Application Priority Data

Mar. 26, 2003 (DE) ................. 103 13 576

(51) Int. Cl.
  *B65B 35/50* (2006.01)
  *B65G 65/02* (2006.01)
  *B65G 57/22* (2006.01)

(52) U.S. Cl. .............. 53/540; 53/556; 414/791.6; 414/416.11; 414/902

(58) Field of Classification Search ............ 53/540, 53/556; 414/791.6, 797, 416.11, 902
See application file for complete search history.

(56) References Cited

U.S. PATENT DOCUMENTS

| 4,546,593 A | 10/1985 | Lasscock |
| 5,733,098 A | 3/1998 | Lyon et al. |

FOREIGN PATENT DOCUMENTS

| CH | 435116 A | 10/1967 |
| DE | 1506946 B | 10/1970 |
| DE | 4213351 A1 | 10/1993 |
| DE | 3814101 A1 | 11/1998 |
| EP | 0425221 A | 5/1991 |
| EP | 0615925 A | 9/1994 |
| EP | 0636557 A | 2/1995 |
| GB | 2132155 A | 7/1984 |

OTHER PUBLICATIONS

Office Action from German Patent and Trademark Office dated Mar. 4, 2004 for German Application S/N 103 13 576.6, filed Mar. 26, 2003.
English Translation of German Office Action dated Mar. 4, 2004 for German Application S/N 103 13 576.6, filed Mar. 26, 2003.
Search Report from European Patent Office dated Mar. 18, 2005 for copending European Patent Application S/N 04 00 6841.

*Primary Examiner*—Stephen F. Gerrity
(74) *Attorney, Agent, or Firm*—DLA Piper Rudnick Gray Cary US LLP (57) ABSTRACT

A machine for loading a load carrier (20) such as a pallet with packing units (cardboard boxes, collis etc.), which form a load stack (21) on the load carrier, is presented. The machine includes handling and support mechanism (52–57), that allows a packing unit (15) to be loaded. The handling and support mechanism supports the load from below throughout the operation of loading from a feed device (51) onto the load stack. By virtue of the handling and support mechanism, the packing unit may be deposited at any selectable spatial position on the load stack. It is therefore possible to form an optimized load stack on the load carrier in which the packing units are always supported from below, with the result that the loading is not dependent upon the material quality of the packaging of the packing unit.

24 Claims, 13 Drawing Sheets

APPARATUS FOR DEPOSITING A PACKING UNIT AT A DESIRED POSITION ON A LOAD CARRIER

FIELD OF THE INVENTION

The invention relates to an apparatus and a method of loading a load carrier such as e.g. a pallet with packing units, which form a load stack on the load carrier.

TECHNICAL BACKGROUND

In the development of logistics systems there is a trend towards an ever greater degree of automation in order to save costs and time and increase the profitability of the systems. Storage into, and retrieval from, a high-rise installation is therefore frequently effected by automated, computer-controlled rack-mounted storage/retrieval machines. In the output area of a storage system the articles required for an order are loaded onto a means of transport, such as a lorry. For many applications, such as e.g. in the retail trade, a delivery order comprises a plurality of different articles which are loaded by means of load carriers, such as e.g. pallets provided with rollers, onto lorries which deliver them to the individual branches.

Loading the load carriers and/or pallets with the articles, which generally take the form of packing units or collis (e.g. cardboard boxes or shrink-wrapped product packs), has hitherto been done mostly by hand. Building up such a load stack on a pallet requires a lot of skill in order on the one hand to form a stable loading stack, which for transportation is wrapped e.g. in stabilizing film, and on the other hand to achieve optimum utilization of space and as high a loading stack as possible for transportation in the lorry. Manual pallet loading is therefore time-consuming, requires skilled and experienced workers and is a factor limiting the profitability of the logistics system. The manual loading of load carriers with occasionally heavy packing units under ergonomically unfavourable conditions is moreover bad for the health of the workers engaged in loading.

It is therefore known to load pallets by means of a gripper system. In said case, the packing units (collis) to be handled, such as cardboard boxes and the like, are gripped laterally by gripping arms of the robot or from above by vacuum suckers and then loaded according to predetermined rules onto the pallet. The drawback of this is, however, that vacuum grippers are usable only with smooth and stable materials and lateral gripping arms may easily slide off or cause damage to delicate packaging. What is more, the use of laterally applied gripping arms inevitably leaves gaps between the packing units in the loading stack on the load carrier, thereby preventing optimum utilization of space and stability owing to the gaps left between the packing units.

OBJECT OF THE INVENTION

The object of the present invention is therefore to provide an apparatus and a method of loading load carriers, which avoid the described drawbacks of prior art and enable the automatic loading of load carriers with packing units of widely differing size and quality.

The object is achieved by an apparatus for loading a load carrier with packing units forming a load stack, comprising handling and support means, by means of which a packing unit to be loaded is supported from below throughout the operation of loading from a feed device onto the load stack and which are designed so as to deposit the packing unit at any selectable spatial position on the load stack.

The apparatus according to the invention enables fully automatic loading of the packing units onto a load carrier such as e.g. a pallet and the formation of a stable load stack, which is optimized with regard to space utilization. The packing units in said case rest on a support surface throughout the loading operation, with the result that grippers or the like are not needed. Packing units of various shapes and qualities of material may therefore be loaded safely and reliably.

The invention further proposes a method of automatically loading a load carrier with packing units forming a load stack, which method comprises the steps: determination of a three-dimensional loading configuration of the packing units in the load stack, determination of a loading sequence enabling said loading configuration and the successive automated conveying of the packing units onto the load carrier in a loading order corresponding to the determined loading sequence into the position in the load stack determined by the loading configuration.

In the method according to the invention an, in terms of stability and/or space utilization, optimized spatial (three-dimensional) loading configuration of the packing units in the load stack is determined and on said basis an advantageous loading order is determined. In accordance with said order and the determined configuration the packing units are then loaded onto the load carrier automatically, without manual assistance. The method makes it possible to form optimized load stacks and to reduce costs while simultaneously increasing the loading capacity.

The loading apparatus preferably comprises a lifting device for lifting and lowering the load carrier so that during the loading operation, as the load stack grows, the load carrier may be continuously lowered.

For loading the load carrier a loading aid is preferably provided, which encloses at least one, preferably three sides of the load stack and hence offers a support surface during loading of the packing units.

In order upon removal of the loading aid to form a stable load stack, preferably at the same time as the loading aid is lowered relative to the load carrier a stabilizing film is wrapped around the load stack.

For loading laterally enclosed load carriers, such as boxes, containers or mesh boxes, a load-carrier tilting device may be provided, by means of which the enclosed load carrier is tilted e.g. through 90° in a forward direction so that it may be loaded "from above" by the loading device according to the invention. In a corresponding manner a packing-unit tilting device is then preferably provided upstream of the loading apparatus for tilting the packing units through 90 degrees in accordance with the determined loading configuration.

The handling and support means of the loading apparatus preferably comprise a stationary loading plate and a displacement device for displacing the packing units on the loading plate in the direction of the broad side of the load carrier, which is defined as x-direction.

From a feed device, e.g. a conveyor belt, the packing units are preferably lifted by means of lifting pins off the trays, which trays have openings for engagement of the lifting pins. The lifted packing unit is then conveyed by means of a displaceable rake onto the loading plate, wherein the emptied trays are conveyed back into the storage facility.

From the loading plate the packing unit is conveyed preferably by means of a loading tongue into the previously determined position on the load stack. The loading tongue is in said case movable both in x-direction and in the direction of the loading depth of the load carrier (z-direction). For depositing a packing unit from the loading tongue on the load stack a scraper is preferably provided, which is displaceable independently of the loading tongue in z-direction and together with the loading tongue in x-direction.

In order to check the loading operation, a movable scanning device, e.g. by means of lasers, is preferably provided for detecting the instantaneous height of the load stack.

Once a load carrier is full, it is exchanged preferably by means of a load-carrier changing device for a fresh, empty load carrier.

In order to feed a packing unit in a defined position to the loading machine, a rotary apparatus for rotating the trays, which each carry a packing unit, as well as a tray-vibrating device for defined positioning of a packing unit on the tray are preferably provided.

The three-dimensional loading configuration, which in the method according to the invention is determined for automated loading of a load carrier, may be optimized with regard to the loading stability of the load stack, the three-dimensional space utilization and/or the greatest possible height of the load stack. To said end, the three-dimensional loading configuration may be split into individual load planes having packing units as identical in height as possible, wherein the loading sequence or loading order is determined preferably in such a way that the packing units of a plane are introduced always from the back towards the front and from left to right or from right to left.

BRIEF DESCRIPTION OF THE DRAWINGS

There now follows a description of concrete embodiments of the invention with reference to the accompanying drawings.

FIGS. 9a1, 9a2, 9b1, 9b2, 9c1, and 9c2 diagrammatically illustrate the mode of operation of an embodiment of a tray-vibrating device according to the invention.

FIGS. 11-1 through 11-10 schematically illustrate the sequence of the loading operation according to an embodiment of the invention.

DETAILED DESCRIPTION OF EMBODIMENTS

Figure 1:
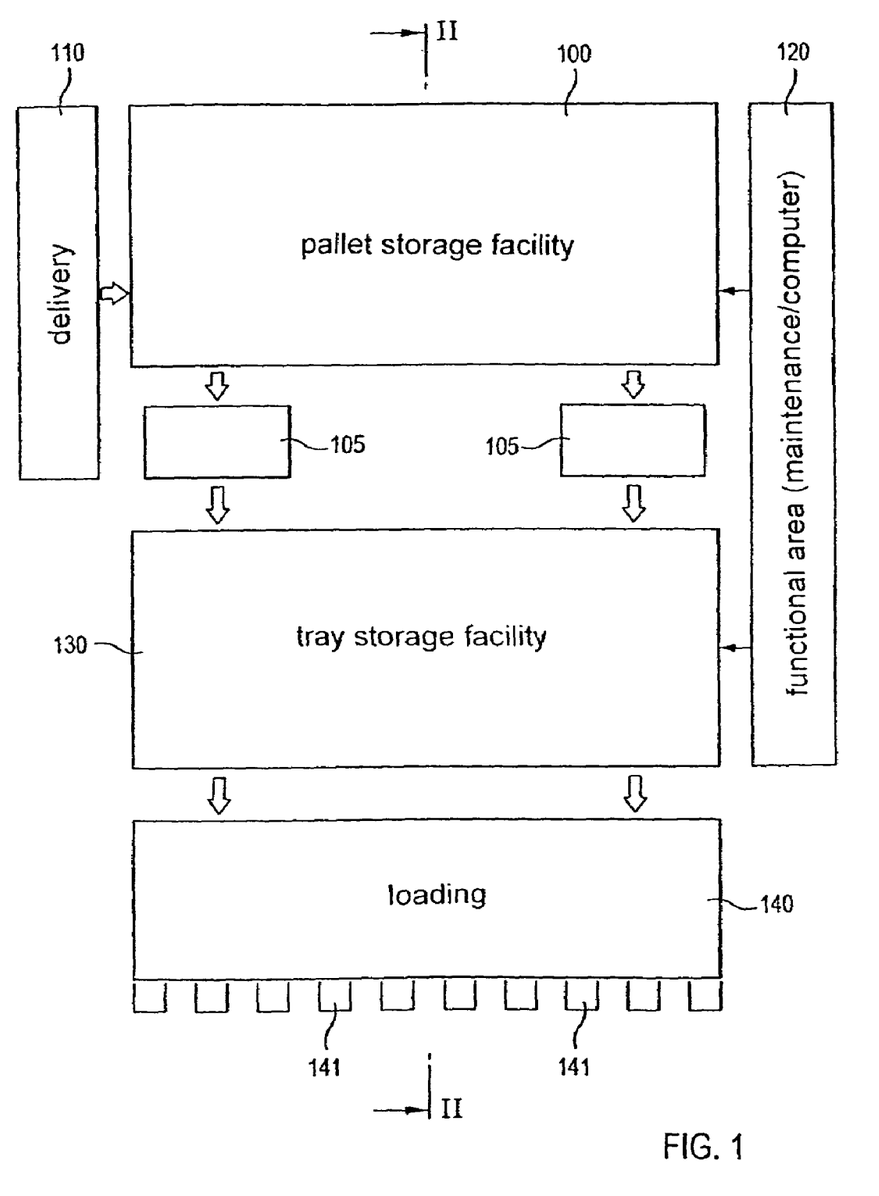
FIG. 1 is a diagrammatic plan view of a storage system, to which the invention is applicable.
Figure 2:
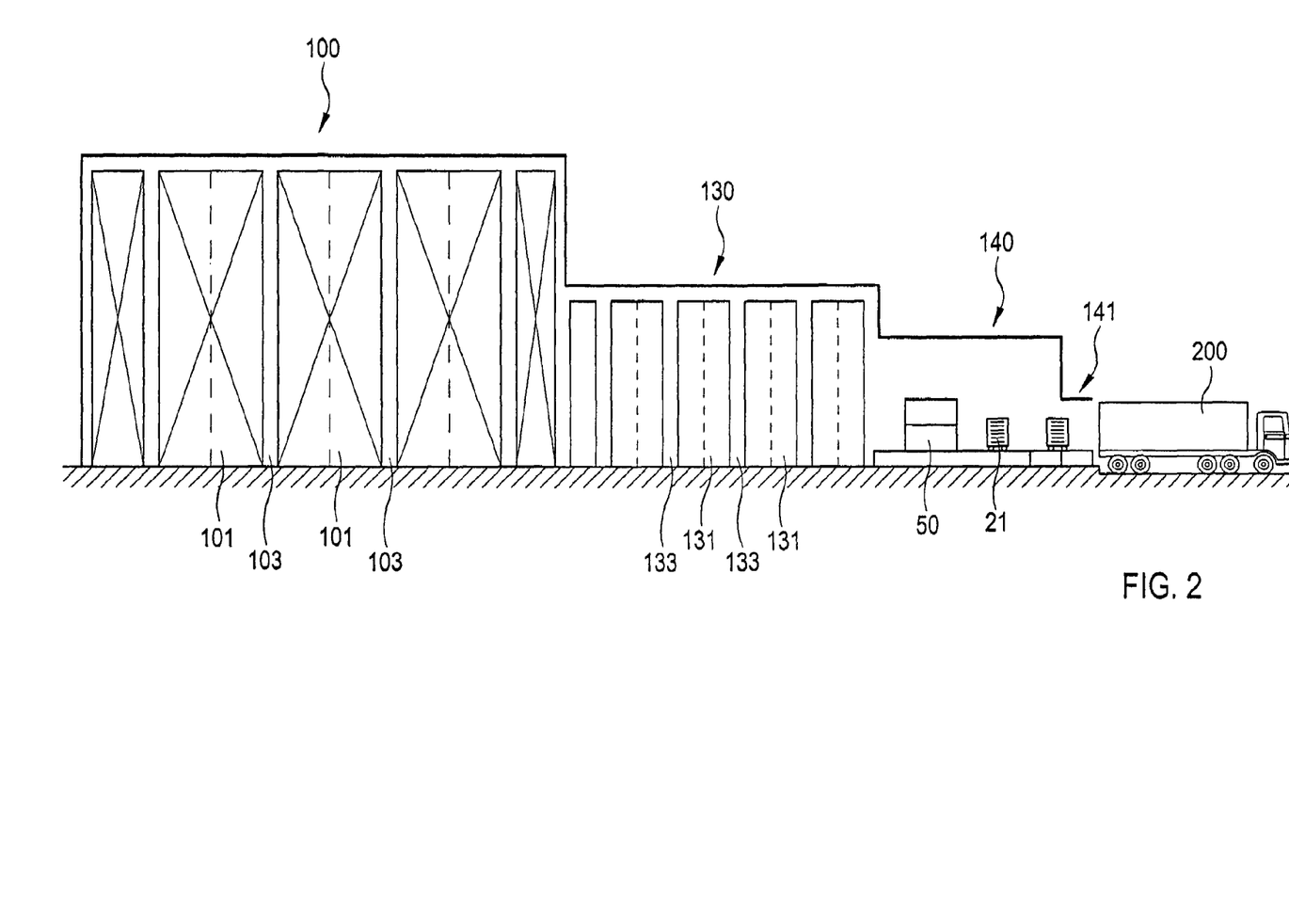
FIG. 2 is a cross-sectional view along the line II—II of FIG. 1.

FIG. 1 shows in plan view an embodiment of a rack storage facility, to which the invention is applicable, and FIG. 2 shows a cross-sectional view along the line II—II of FIG. 1 of the rack storage facility.

The rack storage facility 100 is designed as a pallet storage facility, i.e. the articles or goods delivered to a delivery station 110 are stored on the delivery pallets in the pallet storage facility or input storage facility in rack rows 110. In a known manner rack-mounted storage/retrieval machines are movable in the aisles 103 formed between the rack rows 101 (see FIG. 2) and store the delivered storage pallets in the rack storage facility. Connected by an automated conveying system to the rack storage facility is a tray storage facility 130, which in turn comprises storage racks 131, which are separated by aisles 133 and in which the articles to be stored are stored on trays. According to the embodiment illustrated in FIG. 2 the tray storage facility 130 has a lower overall height than the pallet storage facility 100.

Figure 4:
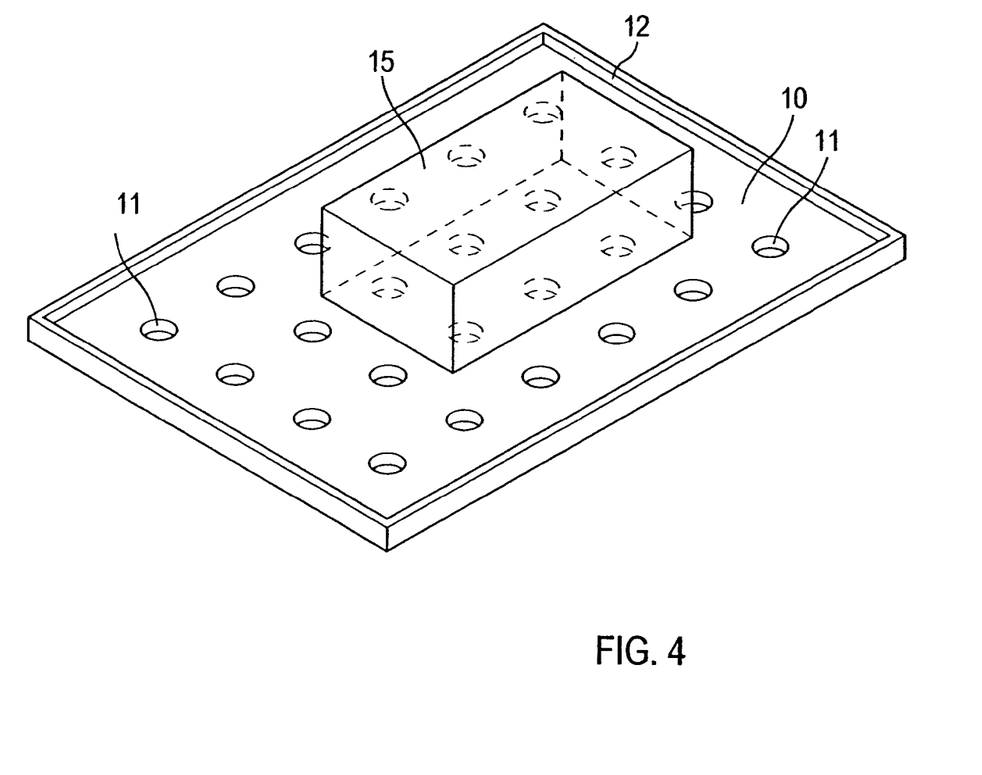
FIG. 4 is a diagrammatic perspective view of a tray with packing units, which are usable with the invention.

FIG. 4 is a diagrammatic view of an embodiment of the trays 10 used in the tray storage facility 130. The trays are generally of a shallow, tablet-shaped design and preferably have a circumferential edge 12. The trays may have different dimensions depending on the articles 15 to be stored. In their base the trays 10 preferably have holes or openings 11, through which—as will be described in detail below—a lifting device for lifting an article stored on the tray may engage. Situated on each tray 10 there is preferably just one article 15, e.g. a packing unit (colli), for loading onto an order pallet of a lorry 200.

As is diagrammatically shown in FIG. 1, between pallet storage facility 100 and tray storage facility 130 a depalletizing device 105 is provided, which in a known manner by means of gripping and suction means automatically splits the storage pallet stacks into the packing units forming the pallet stack. Adjoining the pallet storage facility and the tray storage facility is a functional area 120, which is used for maintenance and repair and may comprise e.g. a warehouse management computer. Adjoining the tray storage facility 130 is a loading zone 140, which comprises one or more loading apparatuses 50 according to the invention for load carriers, on which apparatuses load carriers such as e.g. order pallets are loaded with the packing units 15 required for a pick order. The load carriers with a complete load stack 21 are loaded via a lorry ramp 141 (see FIG. 2) at the same level into the lorry 200.

Figure 3:
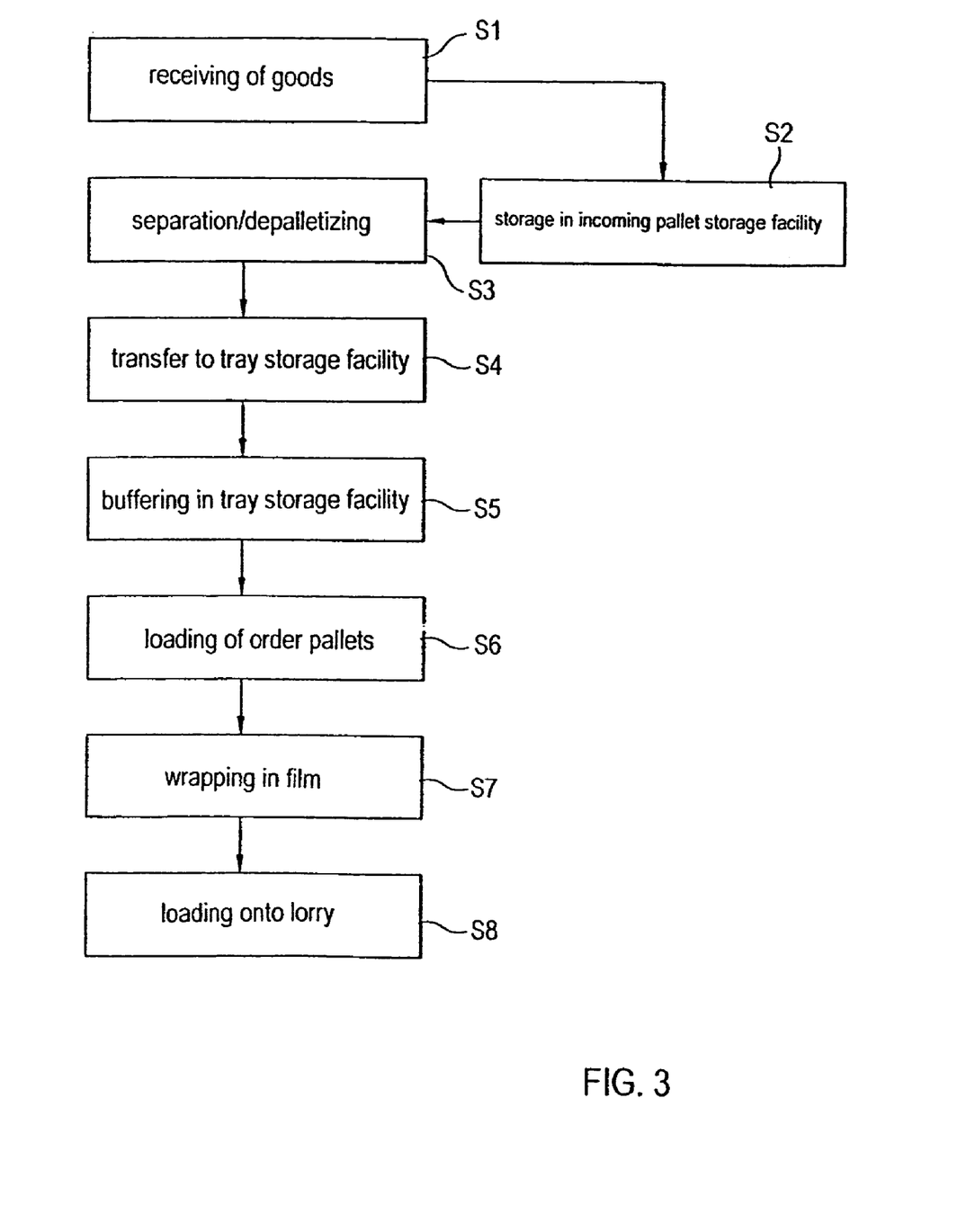
FIG. 3 diagrammatically illustrates central steps of a method of operating an automated warehouse.

The most important operations effected in the storage facility are illustrated diagrammatically in the flow chart of FIG. 3. In a first step Si the goods are delivered, e.g. by lorry, to the delivery station 110 and are stored by means of the preferably automated conveying system in the pallet storage facility 100 (step S2).

The tray storage facility 130 adjoining the pallet storage facility serves as a buffer so that, whenever there is a scarcity of articles in the tray storage facility 130, e.g. there is stock only for a 24-hour or 48-hour period, the articles are requested from the pallet storage facility 100, removed from the pallets and separated in a step S3, before being loaded individually onto the trays 10 (step S4). By means of a suitable conveying system (not shown) the articles on the size-adapted trays are provisionally stored or buffered in tray storage facility 130. Preferably, smaller articles are stored four-deep on small trays or large articles are stored two-deep on larger trays in tray racks.

Figure 8:
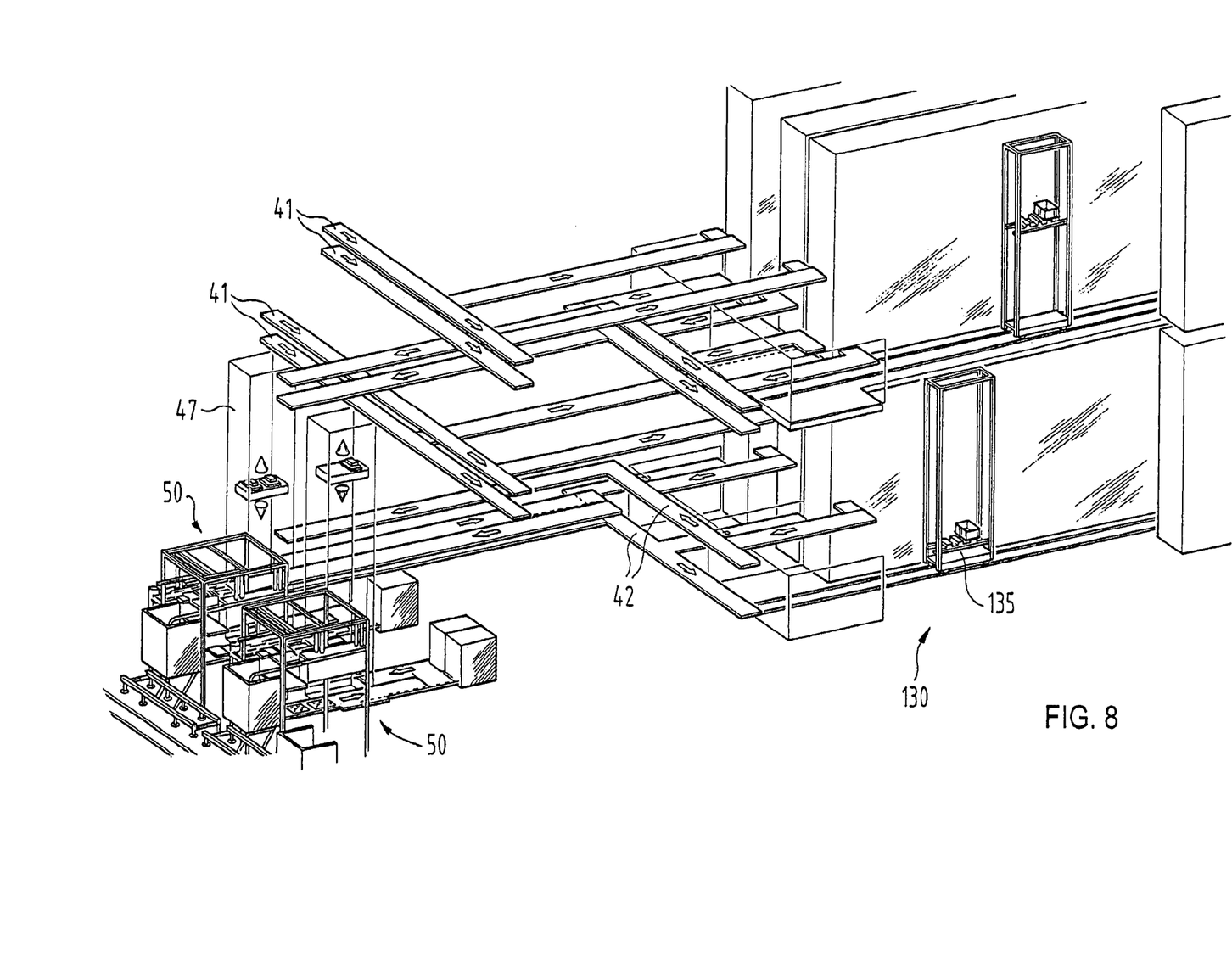
FIG. 8 is a diagrammatic view of a tray storage facility, an embodiment of the loading apparatus according to the invention and the associated conveying system.
Figures 9A, 9A:
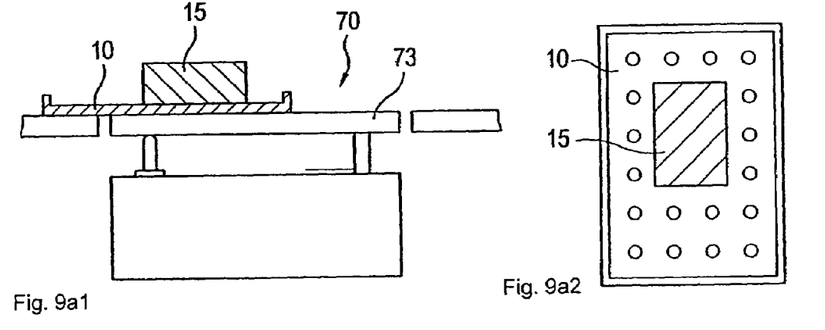
Figure 9B:
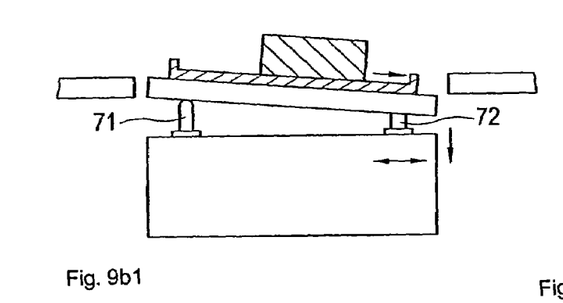
Figure 9B:
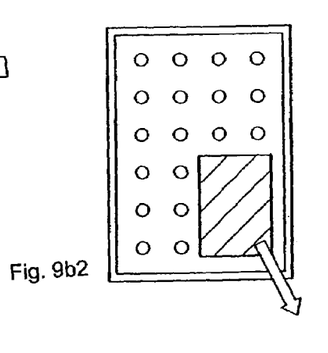
Figures 9C, 9C:
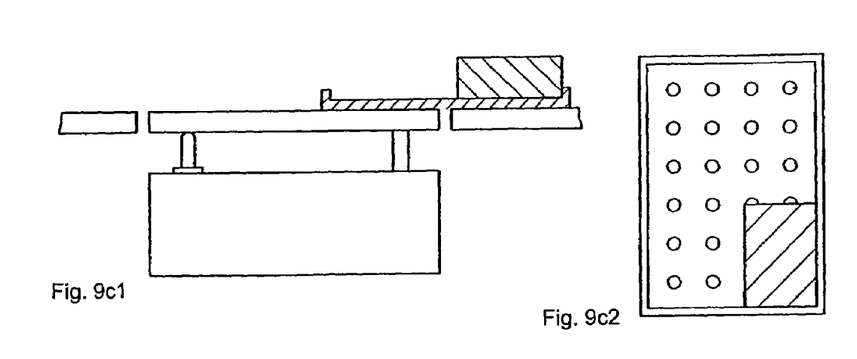

As soon as one or more pick orders, i.e. orders to collate and load a delivery of goods, e.g. for a retail trade branch, are logged, the articles and/or packing units required for the pick order are removed from the tray storage facility by the automated conveying system (rack-mounted storage/retrieval machine 135, retrieval paths 42, see FIG. 8) and fed in a specific order (to be explained in detail below) to the loading zone 140. There, the packing units are loaded onto order pallets (step S6), protective means such as a film, strips or the like are wrapped around the load stacks (step S7) and the latter are finally loaded onto lorries (step S8).

Figure 5:
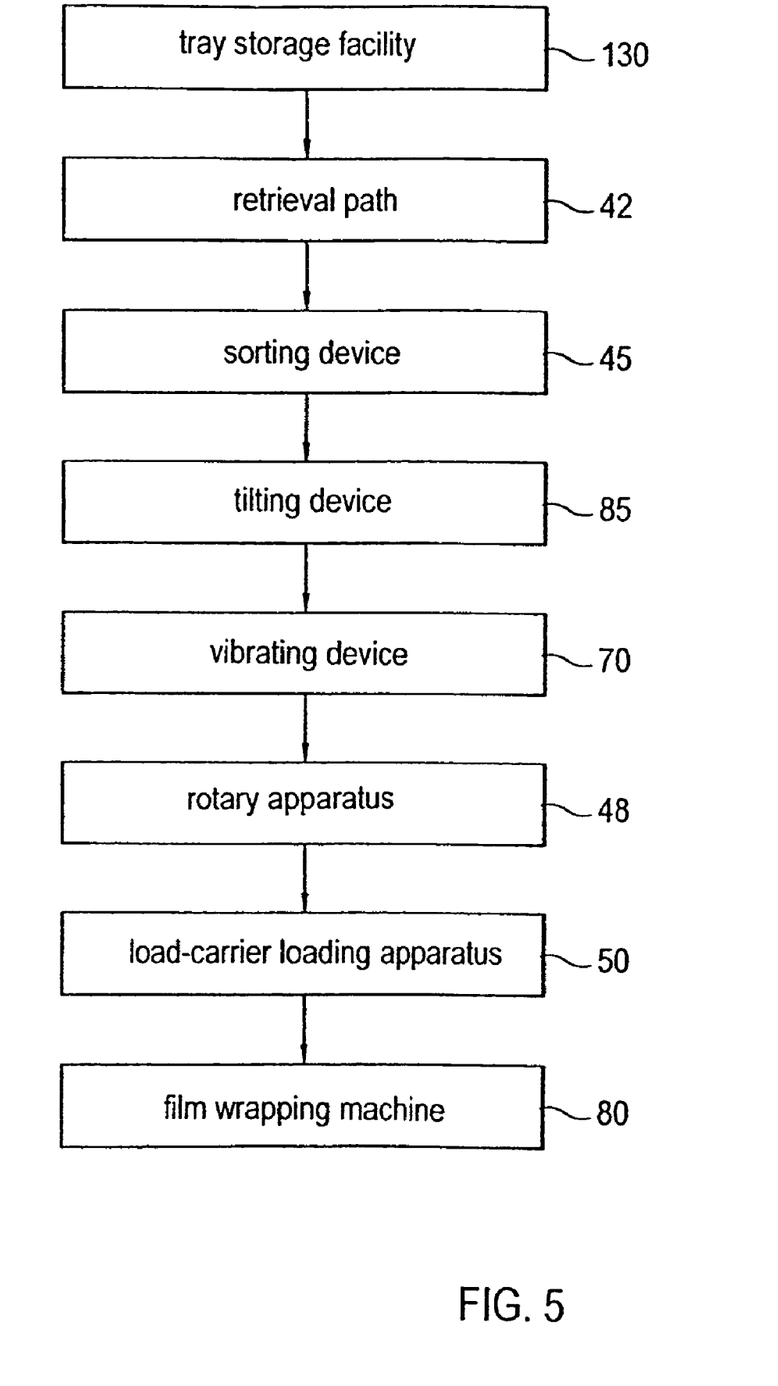
FIG. 5 diagrammatically illustrates the stations, through which a packing unit runs from the tray storage facility up to loading onto the lorry.

A diagram illustrating the individual stations, through which the individual packing units run from the tray storage facility up to loading onto the lorry, is shown in FIG. 5. The packing units are removed from the tray storage facility 130 by suitable rack-mounted storage/retrieval machines 135 (see FIG. 8) and transferred onto retrieval paths 42, which take the form of endless conveying devices. The retrieval paths preferably have one or more sorting devices 45, which may be designed as overtaking devices with a parallel track or passing track of the retrieval path 42, which track is provided with two sorting gates, and enable an overtaking operation or a change of the retrieval sequence of two or more trays removed from the tray storage facility.

A packing-unit tilting device 85 may then be provided for tilting a packing unit on the tray through 90 degrees. For said purpose, lifting pins for lifting the packing unit and/or suitable grippers may be used. A tray then moves onto a tray-vibrating device 70, the mode of operation of which is described in detail later with reference to FIG. 9, where the packing unit 15 may be positioned in a defined manner relative to the tray 10, e.g. in a corner of the tray. The tray plus packing unit then moves to a rotary apparatus 48, at which the tray may be rotated through 90°, 180° or 270° in order to assume a defined position relative to the downstream load-carrier loading apparatus 50. There, the packing units are loaded onto a load carrier and/or order pallet 20 and form a load stack 21, around which for the purpose of stabilization a film is wrapped by a film wrapping machine 80. The load stack thus produced on the pallet may then be loaded onto a lorry and transported to the place of delivery, e.g. a retail trade branch.

Figure 6:
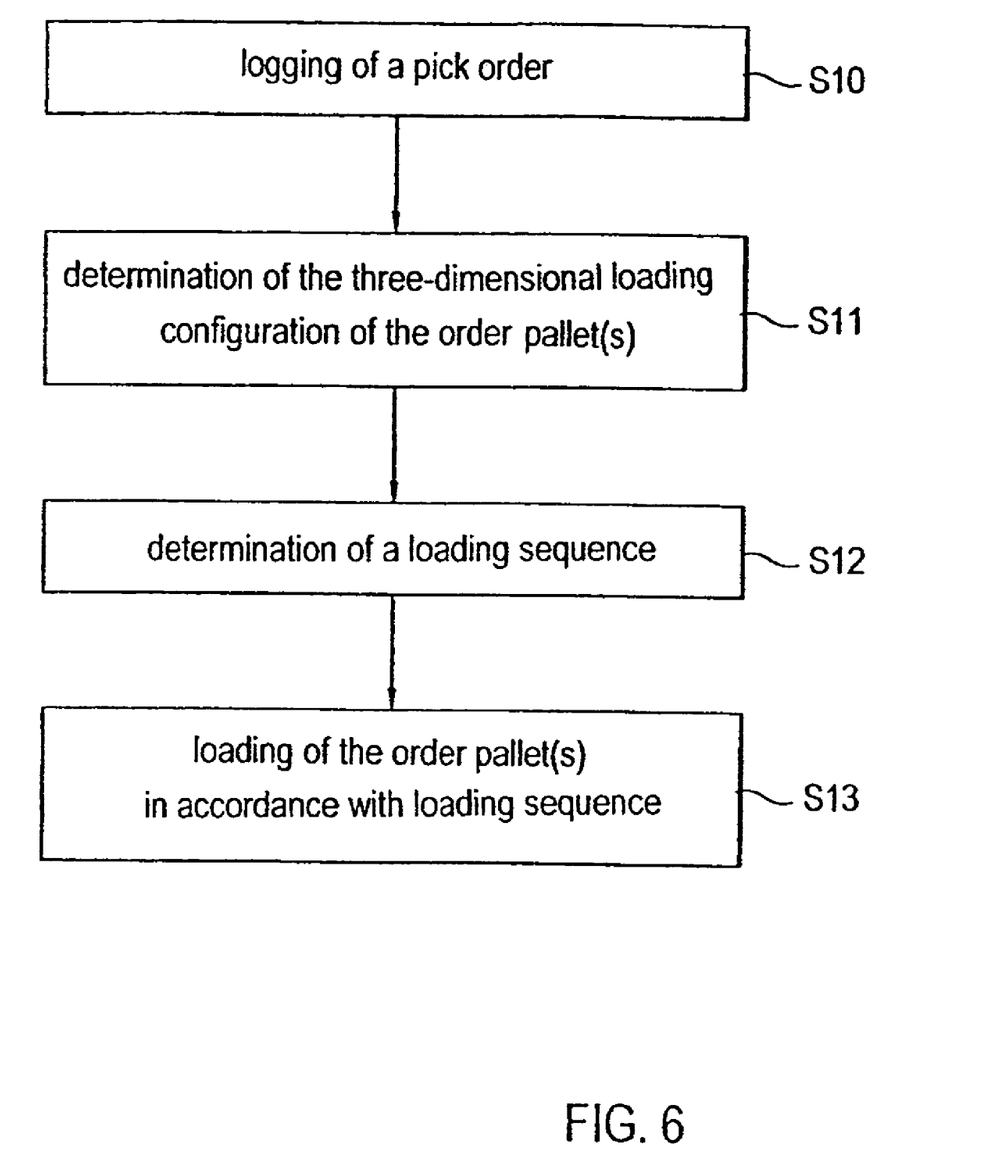
FIG. 6 diagrammatically illustrates in a flow chart the method steps of an embodiment of the method according to the invention of automatically loading a load carrier.

The diagram of FIG. 6 diagrammatically illustrates the method steps of an embodiment of the method according to the invention of automatically loading a load carrier with packing units forming a load stack. In the first step S10 a pick order, which may comprise one or more load carriers (pallets) 20, is logged by the warehouse management computer (not shown). On the basis of the articles being identified by identification codes and their pack sizes being stored in a memory, in a method step S11 a three-dimensional loading configuration of one or more load stacks on the order pallet(s) is determined. In so doing, a wide variety of aspects have to be considered. Firstly, the complete load stack has to be as stable as possible and easily transportable, i.e. heavy articles are preferably stored in the bottom part of the load stack and lighter articles preferably in the top part of the load stack. Equally, more delicate articles or packing units are better accommodated in the top part of the load stack. What is more, the load space of the delivery lorry should be optimally utilized, i.e. the load stack should be as densely packed and as high as possible. Furthermore, the loading configuration has to be such that with the automatic loading machine it is possible to load the load stack in a fixed loading sequence, which is determined in the next step S12. In the following method step S13 the at least one order pallet is loaded in accordance with the loading sequence with the packing units 15 in accordance with the previously determined three-dimensional loading configuration.

Figure 7:
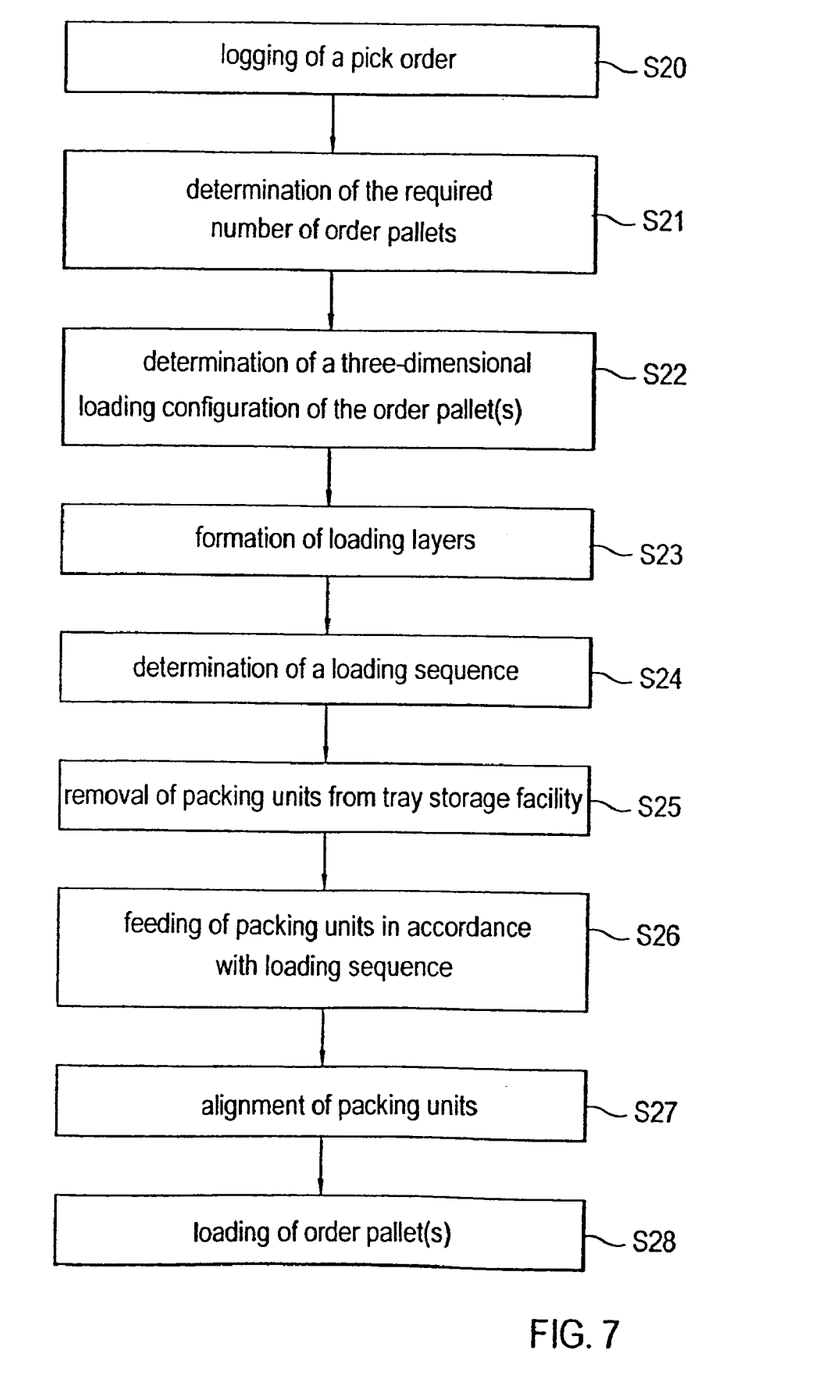
FIG. 7 diagrammatically illustrates in the form of a flow chart a commissioning method, to which the present invention is applicable.

There now follows a detailed description of a further embodiment of the loading method according to the invention with reference to the flow chart of FIG. 7.

In the method step S20 the packing units 15 forming a pick order are logged and in the next method step S21 the required number of order pallets is determined from the stored volume and/or stored weight of the logged packing units. Then, in the manner described above with reference to FIG. 6 a three-dimensional loading configuration of the load stack on the order pallet and/or load carrier 20 is determined, wherein various marginal conditions such as the stability of the load stack or optimum utilization of space are to be taken into account. In said case, it is advantageous to form individual loading layers (step S23), which comprise packing units each of a similar size or at least of a similar height.

In the next method step S24 the loading layers are used as a basis to determine a loading sequence or loading order, in which the load stack 21 derived in step S22 is built from the bottom up. In said case, on an order pallet each loading layer is built up from the back towards the front and from left to right or from right to left.

Once the loading configuration and loading sequence of the load stack have been determined by means of the warehouse management computer, the packing units lying on trays are removed from the buffer—or tray storage facility and fed to the loading machine 50. In said case, it would be possible for the individual packing units to be removed already in the correct order (loading sequence) from the tray storage facility or to be brought into the correct order by means of one or more sorting devices 45 (step S26). By means of a packing-unit tilting device 85 the packing units may be rotated through 90°, 180° etc., by suitable means such as e.g. pins or grippers and then replaced in the rotated position on the tray. Packing units are then aligned horizontally on the tray by means of a rotary apparatus 48 and a tray-vibrating device 70 and fed, optionally via a lift 47 (see FIG. 8), to the loading apparatus 50, where they are disposed in accordance with the loading sequence on the load carrier 20 at the load stack location determined by the spatial (three-dimensional) loading configuration.

The tray-vibrating device used to align an article or packing unit 15 on the tray 10 is now described with reference to FIGS. 9a1, 9a2, 9b1, 9b2, 9c1, and 9c2 (herein collectively referred to as FIG. 9). The tray-vibrating device 70 comprises a tilting support 71 and a lifting piston 72, which supports a support plate 73 at the corner lying diagonally opposite the tilting support 71, and by virtue of a downward movement of the lifting piston effects a diagonal tilting of the support plate 73 and hence of a tray 10 resting thereon.

The operation of aligning the packing unit 15 on the tray 10 is diagrammatically illustrated in FIG. 9 in the diagram sequence 9a1, 9b1, and 9c1 in side view and in the diagram sequence 9a2, 9b2, and 9c2 in plan view. In FIGS. 9a1 and 9a2, the tray 10 carrying the packing unit 15 passes from the conveying device onto the support plate 73 of the tray-vibrating device 70. In FIGS. 9b1 and 9b2, the lifting piston 72 is lowered with simultaneous horizontal vibrating motions (to overcome frictional forces) so that the packing unit 15 moves towards the lowered corner of the tray 10 (see arrow in FIG. 9b2), with the result that the packing unit 15 is aligned on the tray. The lifting piston is then raised again so that the support plate is situated in a horizontal position and the tray 10 with the aligned packing unit 15 may be conveyed further.

Figure 10:
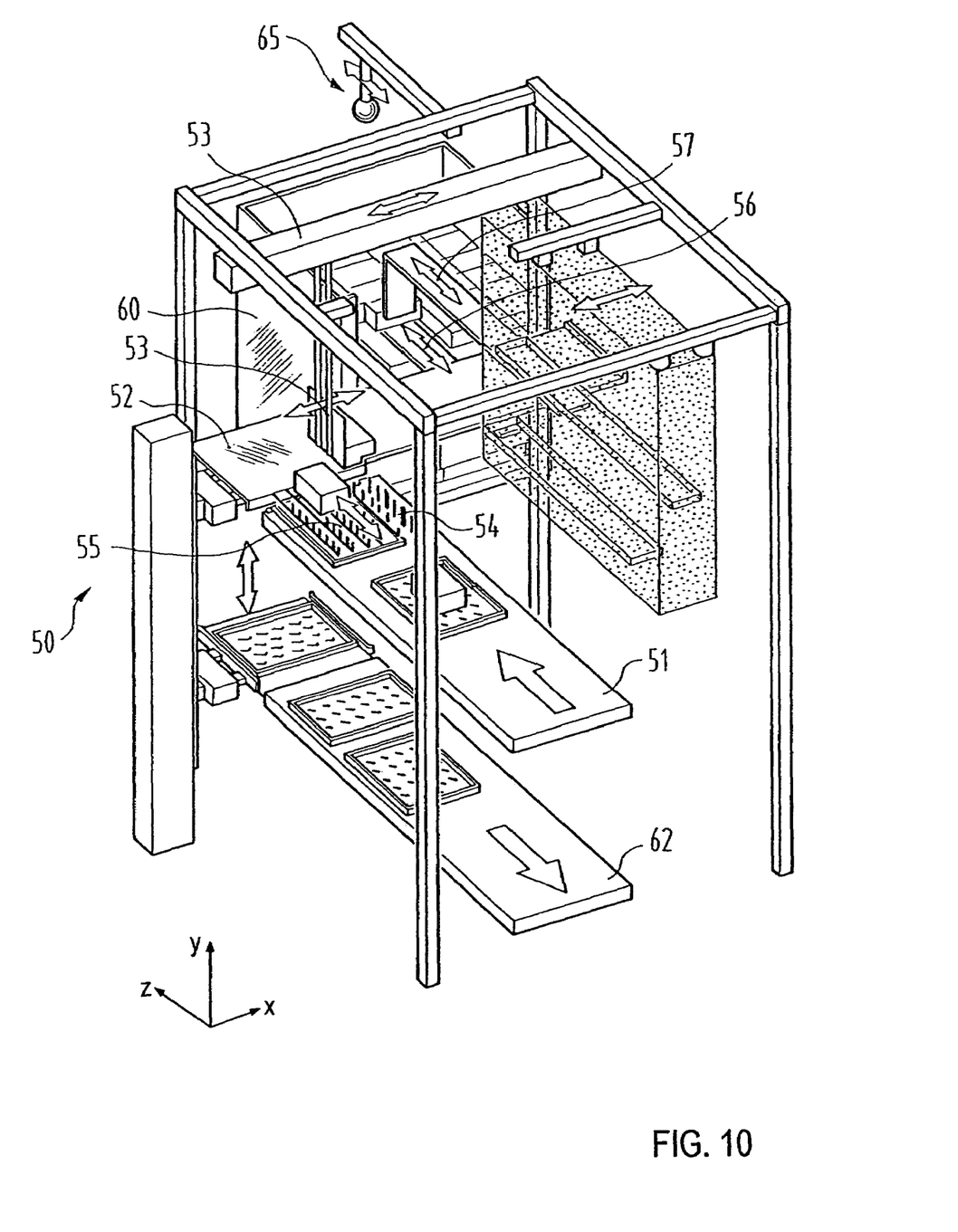
FIG. 10 is a diagrammatic perspective view of an embodiment of the loading apparatus according to the invention.
Figure 12A:
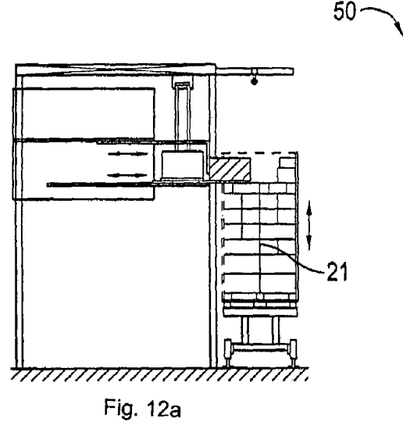
FIGS. 12a through 12e are a sequence of diagrammatic side views of an embodiment of the loading apparatus according to the invention illustrating the mode of operation of the invention.
Figure 12B:
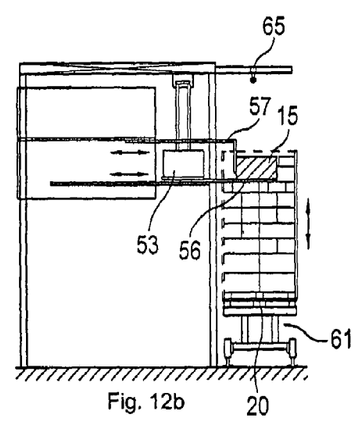
Figure 12C:
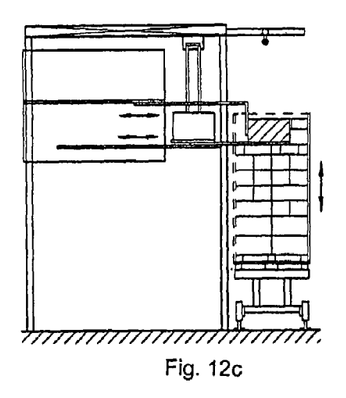
Figure 12D:
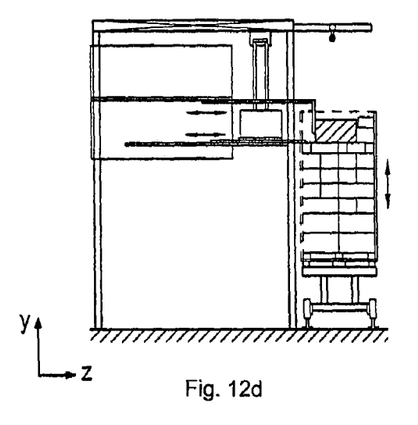
Figure 12E:
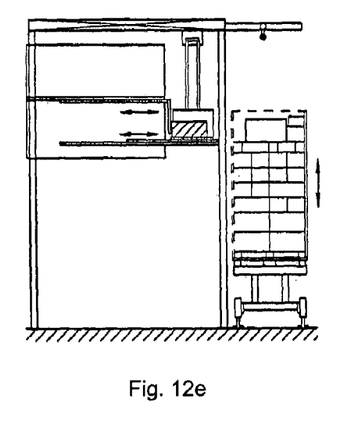

FIG. 10 is a perspective view of an embodiment of the load-carrier loading apparatus 50 according to the invention. The mode of operation of this embodiment is further clarified by the sequence diagrams shown in FIGS. 11 and 12.

The trays 10 each carrying a packing unit 15 are fed by a tray conveyor 51 to the loading apparatus 50. At the end of the tray conveyor 51 lifting pins 54 of a lifting device act from below through the openings 11 in the tray upon the packing unit 15 and hence lift the latter out of the tray 10. A rake 55 then acts upon the packing unit 15 and pushes it onto a horizontal loading plate 52. The lifting pins may then be dropped back under the tray conveyor 51 so that the empty tray 10 may be conveyed by a tray-returning conveyor 62 back into the tray storage facility. The packing unit 15 situated on the loading plate 52 is moved by means of a displacement device (pusher) 53 in x-direction, i.e. in the direction of the longitudinal side of the load carrier 20, to the intended x-position of the packing unit in the loading configuration of the load stack 21. The packing unit 15 is then pushed by means of a scraper 57 onto a loading tongue 56, which projects in z-direction (depth direction of the load stack), and moved by means of said loading tongue in z-direction to the intended z-position of the three-dimensional loading configuration of the load stack. Then the loading tongue 56 is retracted, while the scraper 57 initially remains in position, with the result that the packing unit 15 is deposited at its intended position on the load stack. Loading tongue and scraper are then retracted in order to receive the next packing unit. In order to perform the described loading task, loading tongue and scraper have to be movable simultaneously in x-direction and independently of one another in z-direction.

The order load carriers may be e.g. commercially available pallets such as so-called Euro pallets. The invention is however also suitable for use with laterally enclosed load carriers such as e.g. boxes, containers or mesh boxes. For loading such enclosed load carriers by means of the loading apparatus a load-carrier tilting device (not shown in the drawings) is provided, which tilts an enclosed load carrier through 90° in a forward direction so that it is accessible and may be loaded, as it were, from above. With the aid of the previously mentioned packing-unit tilting device 85 the packing units may be brought into the corresponding tilted position prior to loading.

The loading operation is described once more in detail below with reference to the sequence diagrams in plan view of FIGS. 11-1 through 11-10 (herein collectively referred to as FIG. 11). In FIG. 11-1, the packing unit 15 situated on the tray 10 is acted upon by the lifting pins 54 and then conveyed by the rake 15 onto the loading plate 52. The packing unit 15 is then displaced by the displacement device 53 in x-direction to the loading position (FIGS. 11-2 and 11-3). Once the correct x-position has been reached (FIG. 11-4), the packing unit is pushed by the scraper 57 onto the loading tongue 56 (FIG. 11-5) and then, while lying on the loading tongue 56, is pushed in z-direction to the intended position (FIGS. 11-6 and 11-7) and then pressed by a slight movement of the loading tongue in (in said case) negative x-direction against a packing unit already provided in the load plane (FIG. 11-7). The loading tongue is then retracted, while the scraper 57 initially remains in position (diagram 8), with the result that the packing unit 15 is deposited in its intended position. Finally, loading tongue and scraper are both retracted so that the next packing unit 15a may be positioned.

Figures 116, 117, 118, 119, 1110:
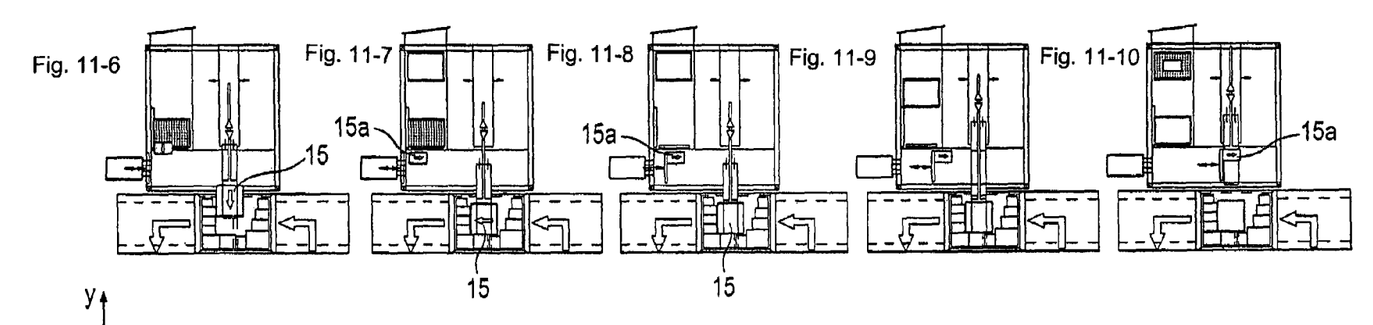

As is evident from FIG. 11-6, as the first packing unit 15 is being loaded by the loading tongue onto the load stack, the next packing unit is already being pushed by the rake 55 onto the loading plate 52, then in FIGS. 7, 8, and 9 displaced by the displacement device 9 in x-direction into the correct position and in FIG. 11-10 acted upon by the scraper 57.

The individual trays and packing units follow one another at a distance that allows each of the individual movements to be non-interacting and to be executed independently of one another.

The sequence of FIGS. 12a through 12e (herein collectively referred to as FIG. 12) shows the mode of operation of the loading apparatus according to the invention in side view. Here, mention should be made of the pallet-lifting device 61, which effects the positioning of a packing unit in the load stack in y-direction by lifting and/or lowering the load carrier. It is also clearly evident from FIG. 12 how in FIGS. 12a), 12b), 12c) the packing unit 15 ("cardboard box") is conveyed by loading tongue 56 and scraper 57 to the correct depth position on the load stack. In the method step shown in FIG. 12d) the loading tongue 56 is already retracted and the packing unit is held in position only by the scraper 57, which in FIG. 12e) likewise retracts in order to be able to act upon the next packing unit.

Also provided in the illustrated embodiment is a scanning device 65, e.g. in the form of a laser scanner for detecting the actual height of the load stack and for checking whether the loading operation corresponds to the calculated stipulations. The scanning device 65 is preferably disposed in a movable manner.

Also evident from FIGS. 10 to 12 is the loading aid 60, which encloses the developing load stack 21 on three sides and hence may serve as a support surface for a pushing movement of the packing units in horizontal direction.

Figure 13:
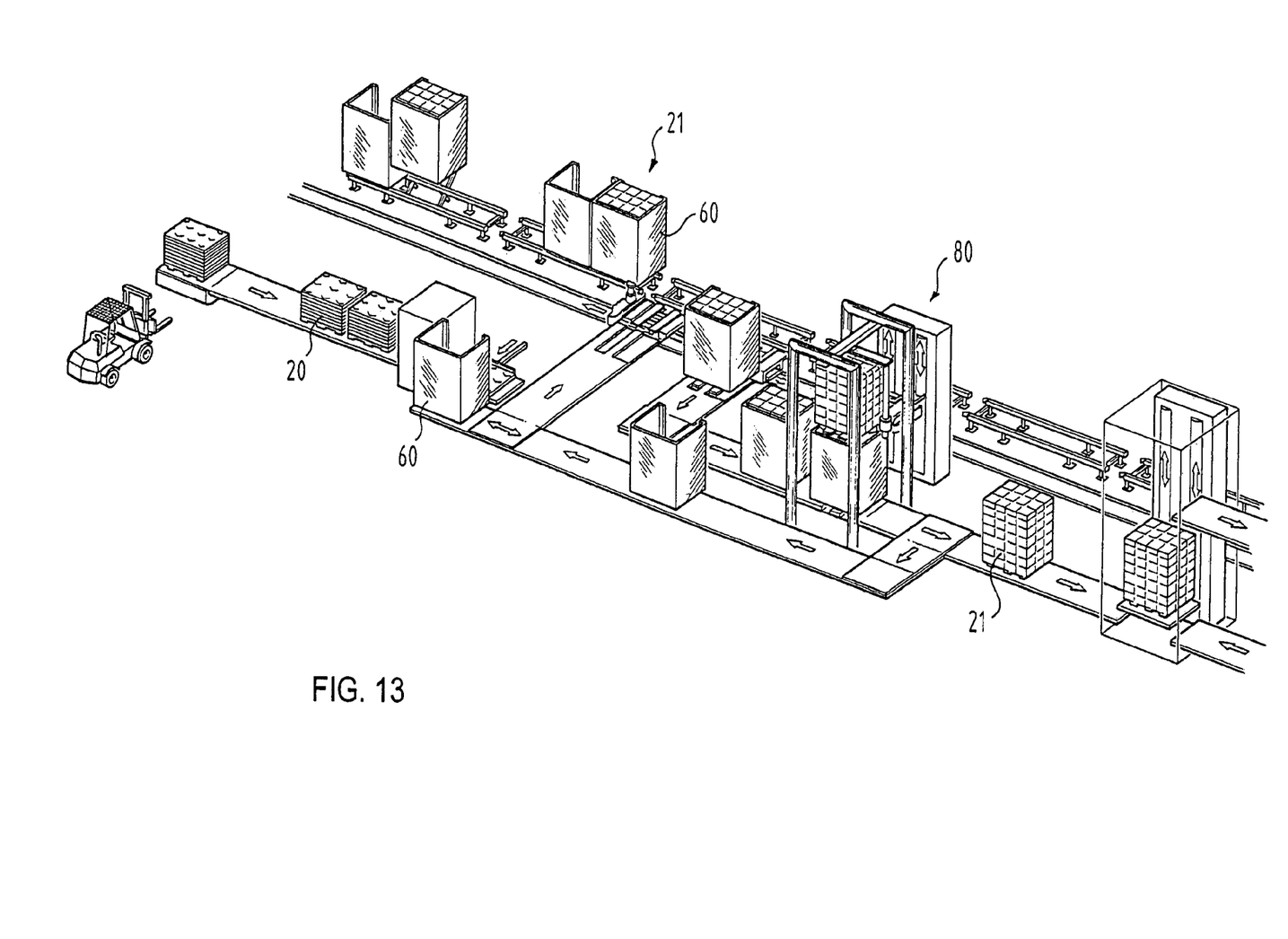
FIG. 13 shows a film wrapping apparatus according to an embodiment of the present invention.
Figure 111:
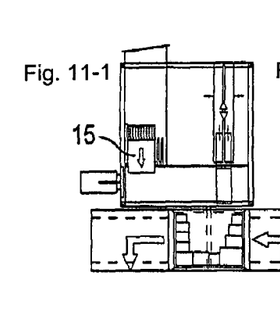
Figures 112, 113, 114:
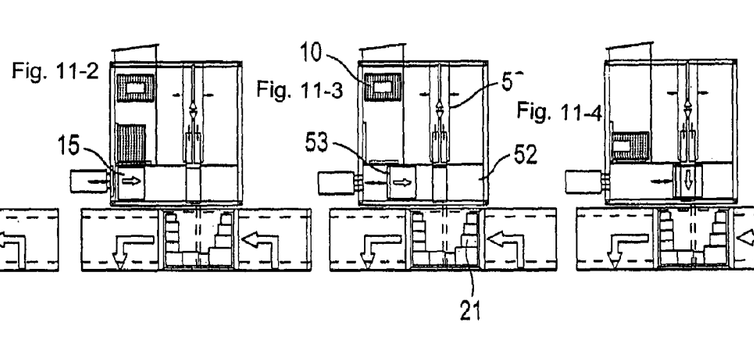
Figure 115:
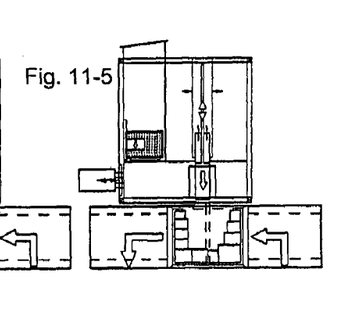

As soon as a load carrier has been fully loaded with a load stack 21, a load-carrier changing device 58 exchanges the full load carrier for a fresh, empty load carrier (FIG. 13). The full load carrier passes, as is likewise shown in FIG. 13, to a film wrapping machine 80, in which the loaded load carrier 20 is lifted out of the loading aid 60 and simultaneously wrapped in a film to stabilize the load stack. The wrapped load stack is then moved by means of a lift or the like to a loading ramp for loading of the lorry, while the empty loading aid is provided with a pallet and then returned to the loading apparatus.

The invention therefore allows automated loading of load carriers such as pallets with articles supplied in various packing units, wherein material-independent and careful loading may be ensured. It is moreover possible to form stable load stacks with good utilization of space and at the same time economically achieve a high commissioning capacity.

| List of reference characters | |
|---|---|
| 10 | tray |
| 11 | tray openings |
| 12 | edge |
| 15 | packing unit, cardboard box |
| 20 | load carrier, order pallet |
| 21 | load stack |
| 41 | storage paths |
| 42 | retrieval paths |

-continued

List of reference characters

| | |
|---|---|
| 45 | sorting device/overtaking device |
| 47 | lift |
| 48 | rotary apparatus |
| 50 | pallet-loading machine, COM |
| 51 | tray conveyor |
| 52 | loading plate |
| 53 | displacement device, pusher |
| 54 | lifting pins |
| 55 | rake |
| 56 | loading tongue |
| 57 | scraper |
| 58 | load-carrier changing device |
| 60 | loading aid |
| 61 | pallet-lifting device |
| 62 | tray-returning conveyor |
| 65 | scanning device |
| 70 | tray-vibrating device |
| 71 | tilting support |
| 72 | lifting piston |
| 80 | 73 support plate |
| 80 | film wrapping machine |
| 85 | packing-unit tilting device |
| 100 | pallet storage facility |
| 101 | storage racks |
| 103 | aisles |
| 105 | depalletizing device |
| 110 | delivery |
| 120 | functional area |
| 130 | tray storage facility |
| 131 | storage racks |
| 133 | aisles |
| 135 | rack-mounted storage/retrieval machines for tray storage facility |
| 140 | loading |
| 141 | lorry ramps |
| 200 | lorry |

The invention claimed is:

1. Apparatus for loading a load carrier with packing units forming a load stack, comprising:
   handling and support means, by means of which a packing unit to be loaded is supported from below throughout the operation of loading from a feed device onto the load stack and which handling and support means are designed to deposit the packing unit at any selectable spatial position on the load stack, the handling and support means including:
   a stationary loading plate and a displacement device for displacing the packing unit on the loading plate in an x-direction horizontally along the broad side of the load carrier, and wherein the feed device feeds the packing unit in each case individually on a tray provided with openings, and
   means for lifting the packing unit from the tray.

2. Apparatus according to claim 1, comprising a lifting device for lifting and lowering the load carrier.

3. Apparatus according to claim 1, wherein a loading aid is provided for loading of the load carrier.

4. Apparatus according to claim 3, wherein the loading aid encloses three sides of the load stack.

5. Apparatus according to claim 3, further comprising a wrapping device for wrapping protective means around the fully stacked load stack in order to stabilize the load stack, while at the same time for removal of the loading aid either the load carrier is lifted relative to the loading aid or the loading aid is lowered relative to the load carrier.

6. Apparatus according to claim 1, comprising a load-carrier tilting device for tilting the load carrier in order to load laterally enclosed load carriers.

7. Apparatus according to claim 1, wherein the means for lifting a packing unit from the tray comprises lifting pins for engagement through the tray openings.

8. Apparatus according to claim 7, comprising a displaceable rake for feeding a packing unit, which has been lifted by the lifting pins, onto the loading plate.

9. Apparatus according to claim 1, comprising a device for carrying away empty trays.

10. Apparatus according to claim 1, comprising a movable scanning device for detecting the instantaneous height of the load stack.

11. Apparatus according to claim 1, comprising a load-carrier changing device for exchanging a loaded load carrier for an empty load carrier.

12. Apparatus according to claim 1, comprising a rotary apparatus for rotating fed trays through multiples of 90°.

13. Apparatus according to claim 1, comprising a packing-unit tilting device for tilting a packing unit and for depositing the tilted packing unit on the tray.

14. Apparatus according to claim 1, comprising a sorting device for sorting packing units that are fed to the loading apparatus.

15. Apparatus for loading a load carrier with packing units forming a load stack, the apparatus comprising:
   handling and support means, by means of which a packing unit to be loaded is supported from below throughout the operation of loading from a feed device onto the load stack and which handling and support means are designed to deposit the packing unit at any selectable spatial position on the load stack, the handling and support means including means for lifting a packing unit from a tray, and
   a tray-vibrating device for defined positioning of the packing unit on the tray.

16. An apparatus for loading a load carrier with packing units forming a load stack, the apparatus comprising:
   handling and support means, by means of which a packing unit to be loaded is supported from below throughout the operation of loading from a feed device onto the load stack and which handling and support means are designed to deposit the packing unit at any selectable spatial position on the load stack, wherein the handling and support means includes:
   a stationary loading plate and a displacement device for displacing a packing unit on the loading plate in an x-direction horizontally along the broad side of the load carrier,
   a loading tongue for acting upon a packing unit on the loading plate and for displacing the packing unit in a z-direction of the loading depth of the load carrier, and
   a scraper disposed above the loading tongue and movable independently of the loading tongue in the z-direction in order to retain the packing unit at the desired position on the load stack, wherein said loading tongue and said scraper are designed so as to be movable simultaneously in the x-direction.

17. The apparatus of claim 16 further comprising a lifting device for lifting and lowering the load carrier.

18. The apparatus of claim 16, wherein a loading aid is provided for loading of the load carrier.

19. The apparatus of claim 18, wherein the loading aid encloses three sides of the load stack.

20. The apparatus of claim 18 further comprising a wrapping device for wrapping protective means around the fully stacked load stack in order to stabilize the load stack, where at the same time for removal of the loading aid either the load carrier is lifted relative to the loading aid or the loading aid is lowered relative to the load carrier.

21. The apparatus of claim 16 further comprising a load-carrier tilting device for tilting the load-carrier in order to load laterally enclosed load carriers.

22. The apparatus of claim 16 further comprising a movable scanning device for detecting the instantaneous height of the load stack.

23. The apparatus of claim 16 further comprising a load-carrier changing device for exchanging a loaded load carrier for an empty load carrier.

24. The apparatus of claim 16 further comprising a sorting device for sorting packing units fed to the loading apparatus.

* * * * *